United States Patent [19]

Torkko

[11] 4,236,341
[45] Dec. 2, 1980

[54] ANIMAL TRAP

[75] Inventor: Reino Torkko, Longlac, Canada

[73] Assignee: Canadian Patents & Development Ltd., Ottawa, Canada

[21] Appl. No.: 16,537

[22] Filed: Mar. 1, 1979

[51] Int. Cl.³ ............................................. A01M 23/26
[52] U.S. Cl. ........................................................ 43/88
[58] Field of Search ............................................ 43/88

[56] References Cited

U.S. PATENT DOCUMENTS 4,146,990  4/1979  Conibear .................................. 43/88

*Primary Examiner*—Othell M. Simpson
*Assistant Examiner*—J. T. Zatarga
*Attorney, Agent, or Firm*—J. R. Hughes

[57] ABSTRACT

An animal trap comprising a first frame member made of strong metal rod, generally rectangular in shape and defining a striker bar and an anvil bar connected by side bars, said frame member also having extending bars fixedly connected to the frame at the junction points of the anvil bars and the side bars, extending at a slight angle to the side bars, and ending in end connections, a second frame member similar to the first having similar extending bars ending in end connections, said first and second frame members connected together at the end connections such that their side bars pass each other in close proximity defining X-shaped structures at each end of the trap and such that relative motion may occur from an upper "set" position where the two striker bars lie close to each other to a lower "sprung" position where each striker bar approaches closely to the anvil bar of the other frame member, a metal rod spring device formed of one or more spring coils connected by arms to two rings, said rings encircling said X-shaped structure at one end of the trap and said spring biased such that when the trap is in the set position the rings tend to force the striker bars apart towards the anvil bars, and a trigger device connected to the striker bars to hold them together at the set position and having a trigger release adapted to be operative by an animal passing through the trap to set off the trap causing the striker bars to strike down towards the anvil bars.

2 Claims, 4 Drawing Figures

ANIMAL TRAP

This invention relates to animal traps, and more particularly to a humane animal trap that provides a powerful striking action such that the animal entering the trap is killed rapidly.

There have been many animal trap designs put forward in the past for catching different types of animals in various ways. It has been considered that the type which is designed to strike the neck or the back of the animal as distinguished from the jaw type for grasping and holding a leg of the animal, is more humane. A well known trap of the type designed to kill rather than hold an animal alive in present use is the Conibear trap described in U.S. Pat. No. 3,010,245 issued Nov. 28, 1961 to F. R. Conibear. Other patents describing this type of trap are: U.S. Pat. No. 4,127,960 issued Dec. 5, 1978, to F. Conibear, U.S. Pat. No. 4,128,961 issued Dec. 12, 1978 to F. Conibear; and U.S. Pat. No. 4,133,136 issued Jan. 9, 1979 to F. Conibear.

It is an object of the present invention to provide a humane animal trap that will strike an animal passing through the trap on the head, neck or thorax generally causing rapid death.

This and other objects of the invention are achieved by an animal trap comprising; a first frame member made of strong metal rod, generally rectangular in shape and defining a striker bar and an anvil bar connected by side bars, said frame member also having extending bars fixedly connected to the frame at the junction points of the anvil bars and the side bars, extending at a slight angle to the side bars, and ending in end connections, a second frame member similar to the first having similar extending bars ending in end connections, said first and second frame members connected together at the end connections such that their side bars pass each other in close proximity defining X-shaped structures at each end of the trap and such that relative motion may occur from an upper "set" position where the two striker bars lie close to each other to a lower "sprung" position where each striker bar approaches closely to the anvil bar of the other frame member, a metal rod spring device formed of one or more spring coils connected by arms to two rings, said rings encircling the said X-shaped structure at one end of the trap and said spring biased such that when the trap is in the set position the rings tend to force the striker bars apart towards the anvil bars, and a trigger device connected to the striker bars to hold them together at the set position and having a trigger release adapted to be operative by an animal passing through the trap to set off the trap causing the striker bars to strike down towards the anvil bars.

In drawings which illustrate an embodiment of the invention,

Figure 1:
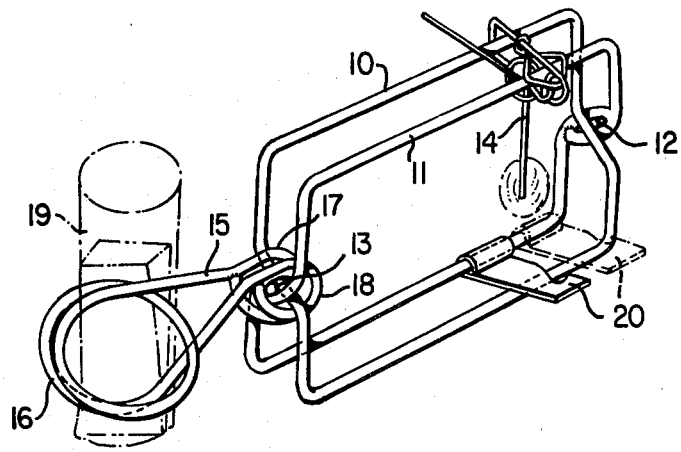
FIG. 1 is a perspective view of the prior art Conibear type of trap.
Figure 4:
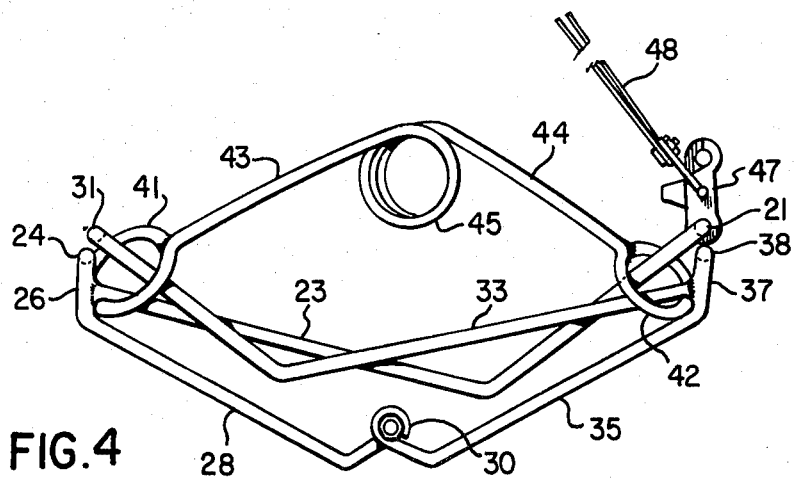
FIG. 4 is a view of the trap after it has been set off.

Referring to FIG. 1, a prior art trap (as illustrated in FIG. 4 of U.S. Pat. No. 3,010,245) is made up of similar rectangular jaw members 10 and 11 which are rotatably connected at 12 and 13. A coil spring 16 which may be connected to a stake or post 19 leads via arms 15 to two rings or loops 17 and 18 which encircle jaw members 10 and 11 as shown. The trap is shown in the set position with a trigger device 14 holding the jaws 10 and 11 together against the spring force on the rings which urges the jaws apart. An animal entering the trap from either direction would hit the trigger 14 setting off the trap. The upper part of jaws 10 and 11 would move down hard towards the lower part striking the animal with a killing blow. The device is completed by base members or safety catches 20.

Figure 2:
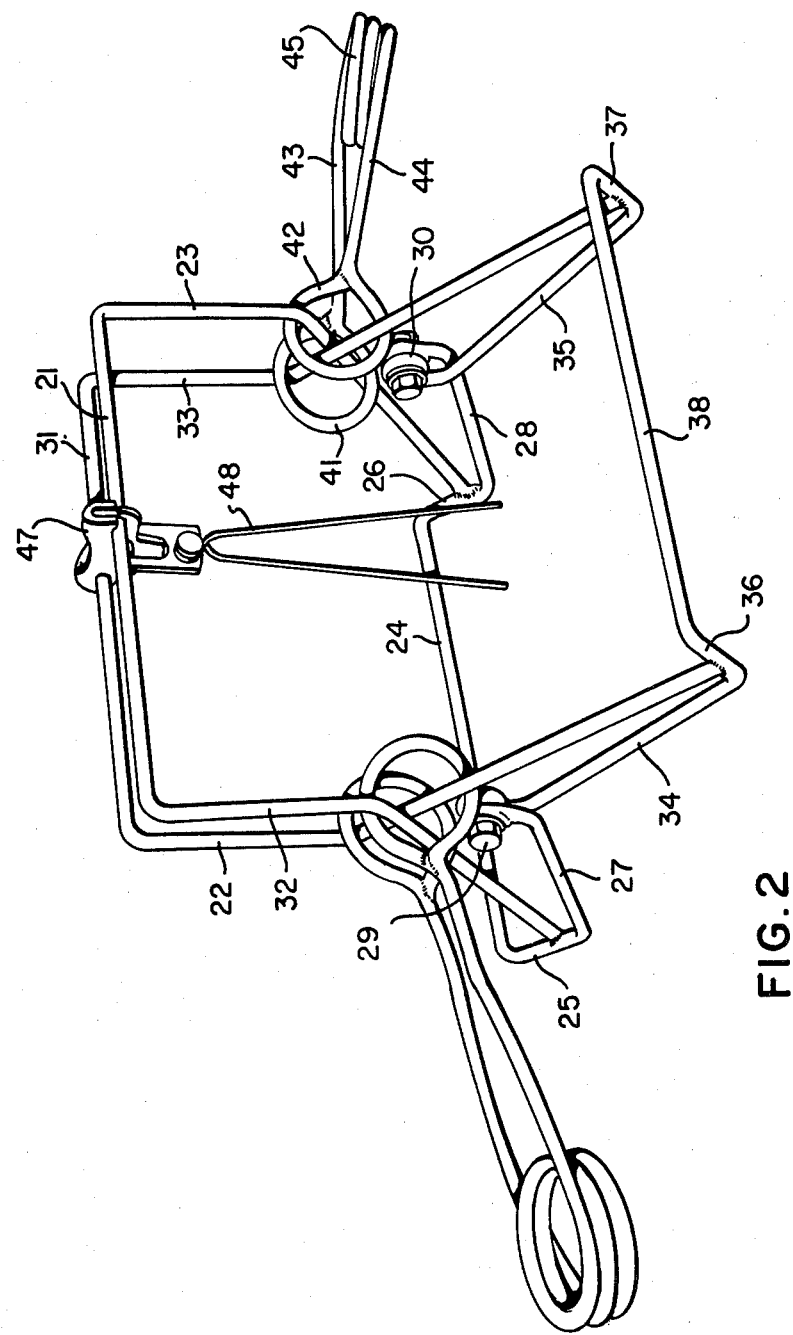
FIG. 2 is a perspective view of the trap of the present invention.

The present invention is of the same general type as that described above and is an improved variant thereon. FIG. 2 is a perspective view of the trap in the "set" position. A first jaw frame member made up of striker bar 21, side bars 22 and 23, and risers 25 and 26 leading to anvil bar 24 is rotatably connected via extending members 27 and 28 and bolts 29 and 30 to a similar jaw frame member. This latter is made up of striker bar 31, side bars 32 and 33, risers 36 and 37 leading to anvil bar 38, and extending members 34 and 35 leading to bolts 29 and 30. Jaw frame side pieces 23 and 33 are shaped to cross each other at an end position where rings or loops 41 and 42 encircle these as shown. These rings are connected via rods 43 and 44 to spring 45 made up of one or more coils. A similar spring mechanism may be located on the opposite side of the trap in relation to side bars 22 and 32. A trigger mechanism 47 holds the two striker bars 21 and 31 close together at the top and has trigger release arms 48 extending into the central area of the trap.

An animal entering the trap from either the front or the rear of the trap as shown hits the trigger release arms setting off the trap with the striker bars 21 and 31 splitting apart and driving down hard towards anvil bars 24 and 38 due to the spreading action of rings 41 and 42 urged by spring 45 to strike and catch the animal.

Figure 3:
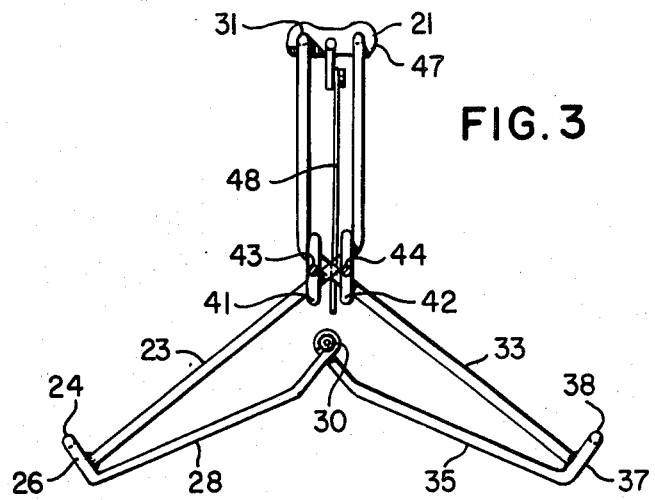
FIG. 3 is an end partial view of the trap in the set position.

FIG. 3 is a partial end view of the trap in the "set" position and FIG. 4 shown the trap in the "sprung" position and illustrate the action of the powerful spring 45 and continuous power due to the first class lever on rings 41 and 42 forcing them to slide along side bars 23 and 33 and driving striker bars 21 and 31 down towards anvil bars 38 and 24.

Various forms of trigger release may be used including the type shown in U.S. Pat. No. 3,010,245. In addition safety catches (not shown) may be provided to hold the trap in the set position to prevent accelerated triggering of the trap while being transported or positioned. The trap members would preferable be made of hard steel rod stock.

What is claimed is:
1. An animal trap comprising:
   (a) a first frame member made of strong metal rod, generally rectangular in shape and defining a striker bar and an anvil bar connected by side bars,
   (b) said frame member also having extending bars fixedly connected to the frame at the junction points of the anvil bar and the side bars, extending at a slight angle to the side bars, and ending in end connections,
   (c) a second frame member similar to the first having similar extending bars ending in end connections,
   (d) said first and second frame members connected together at the end connections such that their side bars pass each other in close proximity defining X-shaped structures at each end of the trap and such that relative motion may occur from an upper "set" position where the two striker bars lie close to each other to a lower "sprung" position where each striker bar approaches closely to the anvil bar of the other frame member, (e) a metal rod spring device formed of one or more spring coils connected by arms to two rings, said rings encircling the said X-shaped structure at one end of the trap and said spring biased such that when the trap is in the set position the rings tend to force the striker bars apart towards the anvil bars, and (f) a trigger device connected to the striker bars to hold them together at the set position and having a trigger release adapted to be operative by an animal passing through the trap to set off the trap causing the striker bars to strike down towards the anvil bars.

2. An animal trap as in claim 1 wherein a metal rod spring device is positioned at each end of the trap.

* * * * *